United States Patent [19]

Sanford

[11] 4,019,363
[45] Apr. 26, 1977

[54] CALIBRATION APPARATUS AND METHOD

[75] Inventor: Philip Horton Sanford, Walpole, Mass.

[73] Assignee: Masoneilan International, Inc., Norwood, Mass.

[22] Filed: Feb. 5, 1976

[21] Appl. No.: 655,483

Related U.S. Application Data

[63] Continuation of Ser. No. 401,142, Oct. 9, 1973, abandoned.

[52] U.S. Cl. .................................. 73/1 R; 73/309
[51] Int. Cl.² .................................. G01F 25/00
[58] Field of Search ............ 73/1 R, 1 B, 1 C, 309, 73/451, 452, 453, 454

[56] References Cited

UNITED STATES PATENTS

| | | | |
|---|---|---|---|
| 2,107,560 | 2/1938 | Boddy | 324/106 |
| 2,834,217 | 5/1958 | Bauer | 73/309 X |
| 2,991,418 | 7/1961 | Kraft | 324/106 |
| 3,304,773 | 3/1964 | Rogallo | 73/DIG. 4 |
| 3,316,763 | 5/1967 | De Giers | 73/1 R X |
| 3,707,868 | 1/1973 | Fruit | 73/4 R |
| 3,771,346 | 11/1973 | Huslin, Jr. | 73/1 B |

*Primary Examiner*—Charles A. Ruehl
*Attorney, Agent, or Firm*—Robert A. Townsend

[57] ABSTRACT

Apparatus and method for the calibrating in the field of media and process condition change transmitters and controllers. Means and method for high resolution calibrating of condition change measuring and indicating apparatus by spring means external to the measuring by, and having a spring rate multiplying the change response of, such apparatus. Means and method of calibrating media and process change transmitters and controllers by inferentially simulating full span condition changes.

43 Claims, 7 Drawing Figures

CALIBRATION APPARATUS AND METHOD

BACKGROUND OF THE INVENTION

This is a continuation of application Ser. No. 401,142 filed Oct. 9, 1973, now abandoned.

This invention pertains to the calibrating of instruments, such as pneumatic or electronic, having means, such as sensors, transmitters, controllers, and the like for measuring and recording, indication and control or regulating of media or process condition changes.

The instruments here concerned have application to such media or process conditions as pressure, differential pressure, absolute pressure, liquid or liquid interface level, temperature, flow rate, and density or specific gravity.

Controllers or transmitters such as here concerned may be installed on large tanks or towers, are thereby remote from ground and are additionally inaccessible in that their process sensors are enclosed in sealed pressure vessels.

Thus the quick and convenient calibration in the field of these instruments has not been possible heretofore.

It is of course possible to dismantle the instrument, and then calibrate it by hanging standard weights from the instrument displacer, float or other condition change sensor. But this method has not been practised because it is so very inconvenient, and also time consuming, requiring as it does a different set of weights for each condition, as for each specific gravity.

What has been frequently utilized heretofore is a wet calibrating means and method, one such being illustrated by Burrus U.S. Pat. No. 3,673,850. This prior wet method, of field calibrating through successive instrument fluid filling and emptying, requires of course the availability and coupling to the typically elevated transmitter or controller of water lines, and the cumbersome and involved pumping and valving of the lines for the required instrument recycling to adjust and re-adjust the zero and range settings.

Such prior wet method and apparatus, even where available, has thus been found so time consuming and otherwise difficult as to be regarded by the art as impractical, or unworkable, or in other words as not affording a satisfactory solution to the aforementioned problem — i.e. the need for quick and convenient checking of the accuracy or adjustment of the instrument, when and as wanted in the field.

The foregoing problem is for all practical purposes solved by the apparatus and method of this invention, through the provision thereby of deflecting spring means, arranged within and for influencing for calibration purposes the output or output signal of the instrument, but detached from or external to the measuring system or circuit thereof; and through the manipulation thereby of said spring means to duplicate the sensory input to the variable displacement measuring means of the instrument.

The invention apparatus and method will be seen as employable with instruments having linear as well as rotary, and force as well as motion, inputs, and hence with both open loop transmitters and closed loop (force-balance, servo-follow-up) controllers.

BRIEF SUMMARY OF THE INVENTION

For the calibrating of transmitter and controller instruments, deflecting spring means and method for simulating the instrument response to media or process deviations or condition changes, without manipulation of the actual or controlled media or process variable.

The invention spring means is mounted independently of or external to the instrument measuring circuit, but constructed and arranged to bias or load the circuit, by push, pull, or torsioning, so as to duplicate the normal, rotary or linear force or motion response of the instrument to particular actual condition changes, or changes of the measured or controlled variable.

In one practise of the invention method, a one limit or zero process condition is established at the instrument, and the spring means is manipulated to inferentially simulate a change from one limit to the other, or a full span condition change, such as producing a full scale excursion of the instrument.

In a motion system, the spring means has a substantially lower spring rate, or force to motion gradient, than that of the instrument measuring circuit, whereby a high resolution calibrating is achieved through the resultant multiplying effect.

DETAILED DESCRIPTION OF THE INVENTION

Figure 1:
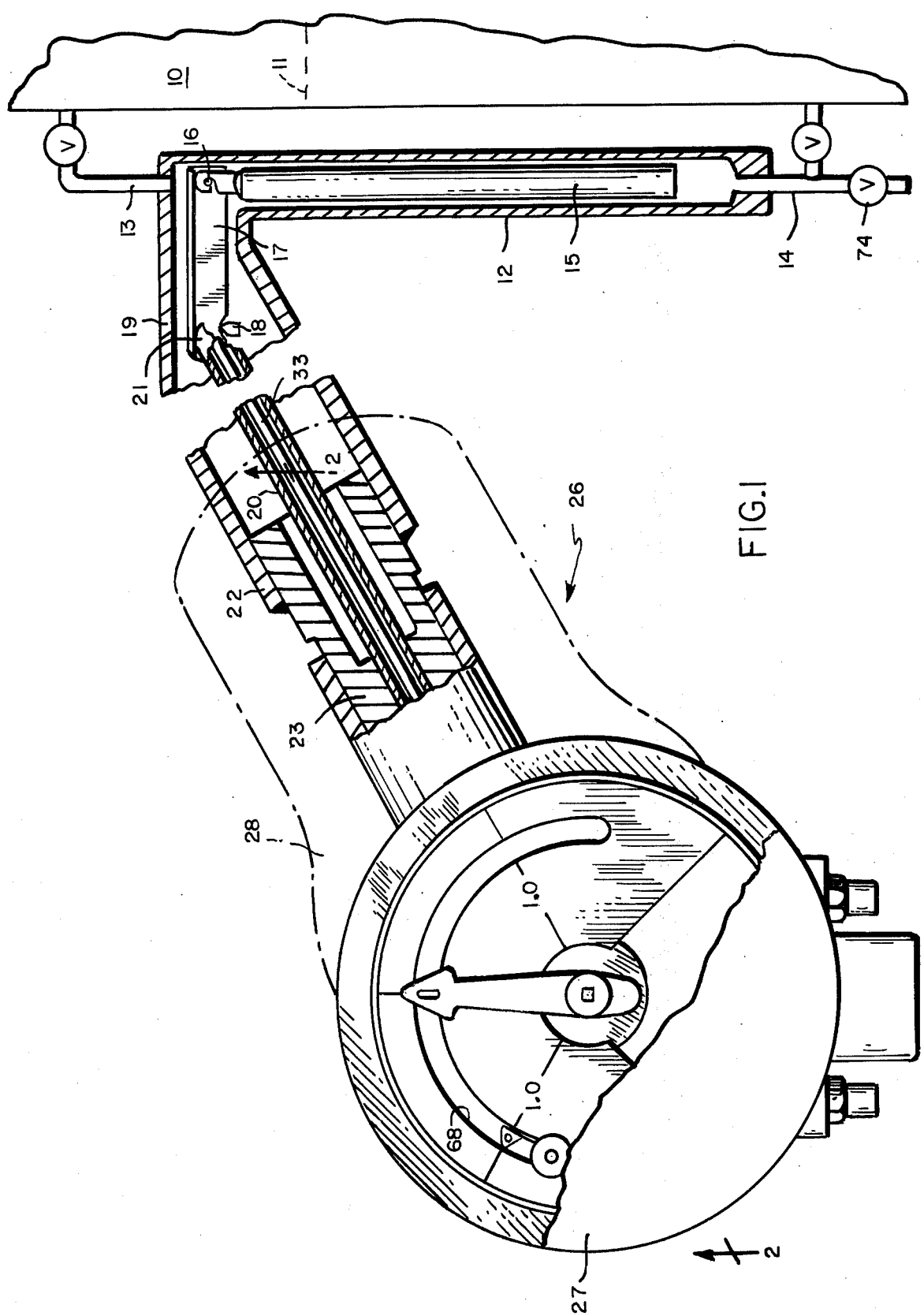
FIG. 1 is a diagrammatic view of an electronic level transmitter incorporating the apparatus and calibratable by the method of this invention.
Figure 2:
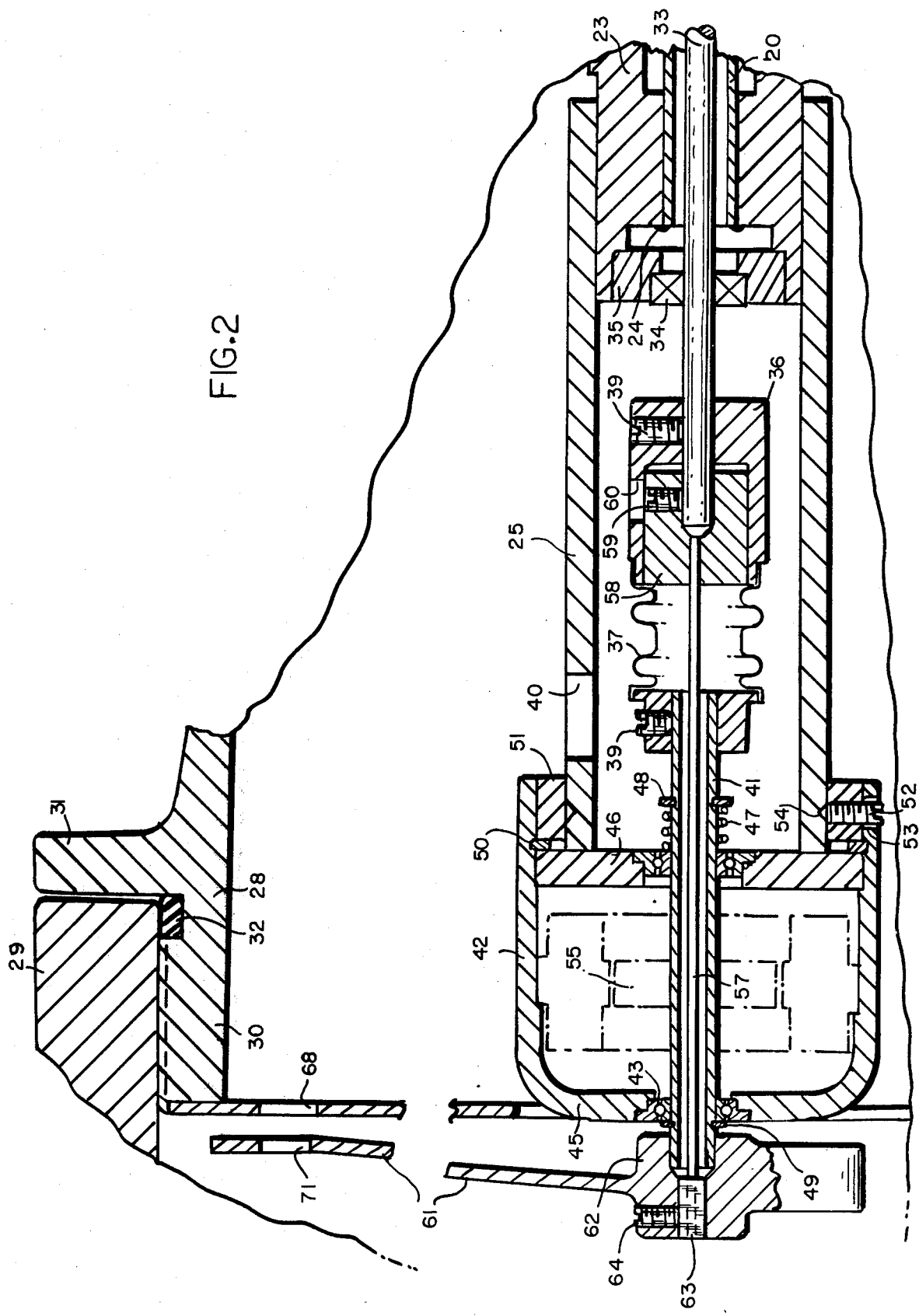
FIG. 2 is a vertical section along the line 2—2 of FIG. 1.

In the exemplary and preferred embodiment hereof, the invention is applied to, or employed for calibrating, a liquid or interface level transmitter of electromechanical or electronic type, and which is conventionally mounted in turn at the side of (or it may be at the top of or in) a tank or vessel whose liquid level or two-liquid interface level 11 is to be sensed or measured and signalled as for recording, indication and/or control.

The transmitter comprises a cage or chamber 12 having top and bottom pipe connections 13, 14 to the tank 10 whereby the measured tank condition or level 11 is reproduced in the chamber.

For the sensory input of the apparatus, whereby the tank process or level changes are sensed or measured, there is provided within the cage or chamber 12 a displacer 15 which, while in the illustrated type being always heavier then the liquid displaced at full immersion, changes its buoyant force with level changes, and has a constant volume, or uniform cross sectional area, whereby its buoyant force changes proportionally with level, or it undergoes a unit or constant change in weight for each unit change in level regardless of the level range.

The liquid or interface level 11 changes, and corresponding displacer 15 buoyancy changes, are reflected by corresponding or portional rotary force or motion changes, by the displacer 15 being pivotally suspended as at 16 from the moment end of a torque arm 17 which at or towards its other end has substantially frictionless support on knife-edge bearing 18 in a process or pressure vessel housing 19 whose configuration, and the fluid-tight joining of which to the displacer chamber, may be as conventional.

The angular movement of torque arm 17, with displacer 15 force change motion, twists or torsionally deflects torsion spring or torque tube 20, that is right angularly joined or fixed, as by welding, at its thereby externally sealed or process end 21 to the bearing end of torque arm 17. The torque tube 20 extends through the torque tube or torque tube extension housing 22 into the internally reduced or walled far end of a cylindrical connector 23, to which remote connector 23 end it is rigidly joined as by welding 24 at the torque tube's thereby internally sealed, grounded end.

Torque tube or torsion spring 20, as is well understood, twists a specific amount for each increment of displacer 15 buoyancy change, and is selected or constructed to combine suitable displacer movement restricting or load carrying ability with low operating stress.

The cylindrical connector 23 tightly interfits and thereby rigidly joins the ends of torque tube housing 22 and steel, thermal-insulating mounting tube 25 thereby supported in atmospheric pressure instrument case 26 having a usual cover 27 and housing 28 joined or interfitting and abutted at cylindrical and radial flanges 29, 30, 31 at which they may also be bolted, threaded, or otherwise releasably secured together, and sealed as by an O ring 32.

In accordance with the invention, a torque rod 33 is welded or otherwise fixed at and within the torque tube process or displacer motion end 21, extends through the torque tube and beyond its fixed or grounded, pressure vessel sealing end 24, and has rotary bearing support therebeyond, as by ball bearing 34 mounted in ball bearing adapter 35 received in turn in connector 23, whereby the displacer 15 motion is transferred through the pressure vessel wall to the instrument measuring means.

Beyond ball bearing 34, but short of its instrument end, torque rod 33 receives a cup-like brass end 36 of an axially flexible, rotatively rigid coupling or brass bellows 37 having or fitted at its other end to a brass end plate 38.

Bellows end 36 is adjustably clamped to the instrument end of torque rod 33 as by set screw 39 before mounting tube 25 is installed thereover, and the other bellows end 38 is adjustably clamped by set screw 40, which is manipulable through tube 25 opening 25a, to a steel shaft or sleeve 41 having its one end accordingly received within said bellows end 38, and extending at its other end through stainless steel housing or cup 42 in which said sleeve 41 is supported for rotation by flanged ball bearings 43, 44 biased respectively into cup end wall 45 and a bearing disc 46 by a wire spring 47 compressed in turn by retaining rings 48, 49 so spaced on the shaft 41 as to confiningly engage or stop the outer ends of spring 47 and bearing 43 respectively.

Bearing disc 46 is held to an internal cup 42 shoulder by a retaining ring 50, and the housing 42 is in turn centered on mounting tube 25 by steel or the like split expansion ring 51 which is expanded against or clamped to the cup 42 insisde by the wedging or turning of ring-threaded set screw 52, as reached through cup access opening 53, into circular tube 25 groove 54, this after cup 42 has been rotatively adjusted to the small extent that may be desired, and is enabled by the oversizing as indicated of set screw 52 receiving opening 53.

The transmitter measuring circuit further comprises a rotary sensor 55 fixed on or rigid with the tube 41, and hence mounted for imparting thereto of the angular motion of torque tube 20. The rotary sensor, or rotary variable differential transformer 55, modulates in known manner an AC signal whose proportional changes are converted to an analogue signal, such as by an amplifier which may be conventional and is therefore not shown, and whose gain may be adjusted to produce, as at milliameter 56, the same 4–20 ma or like full scale signal regardless of the different degrees of torque rod 33 rotation occasioned by the different specific gravities of the different fluids with which the transmitter may be employed, as by transmission of its output signal, or rotary motion signalling output, to a remote receiver, for liquid level recording, indication or control.

In accordance with the invention, a deflecting, compliant or relatively low-rate spring means is mounted in the instrument or transmitter, to be independent of or external to the normal or actual condition change sensing and signalling operating of the measuring circuit, but so as to influence, load or bias the measuring circuit to duplicate the input thereby to the output signal generator, or rotary sensor, in the course of its manipulating or deflecting under the invention to simulate media or process condition changes.

In a rotary system such as herein illustrating the invention, the calibrating apparatus comprises more particularly a torsion spring; means for applying that to the instrument end of the torque rod; and means at, or the arrangement of, the free end of the torsion spring whereby that may be rotated to impress a torque and proportional rotation on the measuring circuit.

In the manipulation of said apparatus under the invention method, the spring's free end is variously rotated in correspondence with the various specific gravities of the process fluids, such as may be shown by graduations on a suitably calibrated dial. And the spring rotations are thereby such as result in sensor rotations which correspond with or simulate full scale excursions of the process fluids over the displacer.

As herein embodied, the torsion spring comprises a wire 57, passed through shaft 41 and bellows 37 into bellows end 36, and therewithin secured, as by brazing, to a solid cylindrical end 58. For the calibrating spring's influencing of the measuring circuit, and thereby of the instrument ouput, as herein by the positioning of the sensor 55, wire end 58 is drive or torque coupled to the instrument end of torque rod 33, by its axial recessing or drilling to receive the same, and by its fastening thereto by a set screw 59, that is engageable through bellows end access opening 60 for its turning down against the rod 33 end.

Under the invention, high calibrating resolution, for rotary systems, is achieved by selecting or fashioning the deflecting spring means, or torsion spring 57, for multiplying the measuring circuit twist or rotation effect. In the example hereof, for instance, the spring is a seventeen times multiplier, in that the wire free end is rotated 60° for 3.5° of sensor rotor rotation. It will be appreciated in this connection that the lower the spring rate of torsion wire 57, within practical stress limitations, the higher its resolution. Also, and again in motion balance systems, the calibrating spring will have for such purpose a low spring rate as compared with that of the resisting or opposing spring, as herein the sum of the series-connected torque tube 20 and torque rod 33.

In accordance with the invention, means are provided for deflecting or stressing, and herein rotating or winding, the calibrating spring means, herein the wire 57, for impressing on or applying to the measuring circuit a linear or rotary independent motion or force, herein a torsion or torque, whereby to duplicate the input force or motion that is produced in said measuring circuit by actual condition or variable deviations or changes, and more particularly to inferentially simulate full span or full scale deviations or changes.

As herein embodied, such spring deflecting or winding means comprise a right angularly disposed, manipulating and also indicating means or pointer 61 having a hub 62 counter-bored for reception over and for sliding or rotation of the pointer 61 about, the sensor shaft 41. Pointer 61 is fitted for winding wire 57 by drilling of hub 62 to additionally receive, and closely fit over, non-round or square wire end 63, to which the pointer 61 is fixed or clamped by set screw 64.

From the foregoing it will again be seen that spring means or wire 57 is drive or torque coupled to the instrument end of torque rod 33, and so as upon its winding manipulation, as by grasping and turning the pointer 61, to torsion the rod 33, and thereby to influence or bias the measuring circuit, through rotation of bellows 37 and sensor shaft 41 similarly as produced by actual input or sensed condition change caused, torque-rod-twisting induced, rotation of rod 33. But spring 57 is seen also as mounted external to or independently of the measuring circuit, thereby serving when unwound to unaffect, or having when relaxed no resistance to or effect on, the measuring circuit response to sensed condition changes.

More particularly, the invention spring means, or wire 57, is independent of or external to the normal operation of the measuring circuit in that the torque rod 33 rotation is transmitted to sensor 55 through bellows 36, 37, 38 and shaft 41, from which latter spring 57 is remote by its relatively rotatable mounting within the same as described.

Means are provided by the invention for indicating the rotation of the spring means, and more particularly comprising a plate 65 mounted as convenient, such as by screws 65a, within the instrument case, and having graduations 66a, 66b showing or indicating, for right or left hand or direct or indirect acting instruments, the deflections or rotations required of the spring 57 by the invention method, or such as generate a torque which will in turn produce a sensor 55 rotation corresponding to that produced by the full scale condition, herein level, changes, of the various media or process variables, herein different specific gravity fluids.

The apparatus further comprises means associated with full-span-deflection or range-scale plate 65 for indicating, or providing a memory of, the selected or particular operating range, and also for releasably retaining or momentarily holding the spring deflecting or winding means or pointer 61 in the full span deflected position. Such range indicating and pointer holding means and herein embodied as a reversible plastic marker or index 67 formed for reception in and lateral or angular extent in a plate sector slot 68, and provided at one end with pointed or triangular, position marking projections 69a, 69b mounting pins or detents 70a, 70b formed and extending for reception in centered, axial pointer slot 71, when that is juxtaposed and hooked thereover, as by its being simply pulled back and then released, and such as enabled by the pointer 61 being of deformable or plastic construction.

Figure 6:
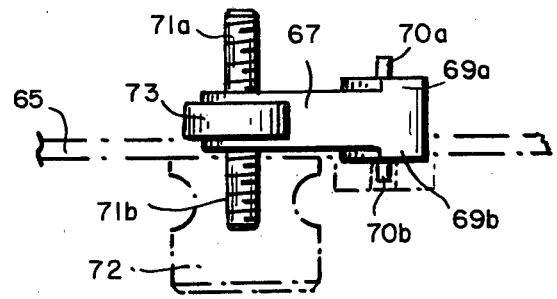

The marker or index 67 is adjustably, and also reversibly or right and left hand, securable in slot 68 by a threaded stud or studs 71a, 71b projecting oppositely from the index other end, and for engagement thereat by a knurled nut 72, for clamping index 67 in position in plate slot 68 by turning down on either of the studs 71a, 71b to draw index enlargement 73 to the back of plate 65 as the nut 72 bears against its front, FIG. 6. For side-to-side re-positioning of reversible index 67, that may be shifted to the plate center, withdrawn through slot enlargement 68a, turned over, and then re-inserted in the slot to re-engage enlargement 73 behind plate 65 with the index pointer then extending to the opposite side.

Figure 3:
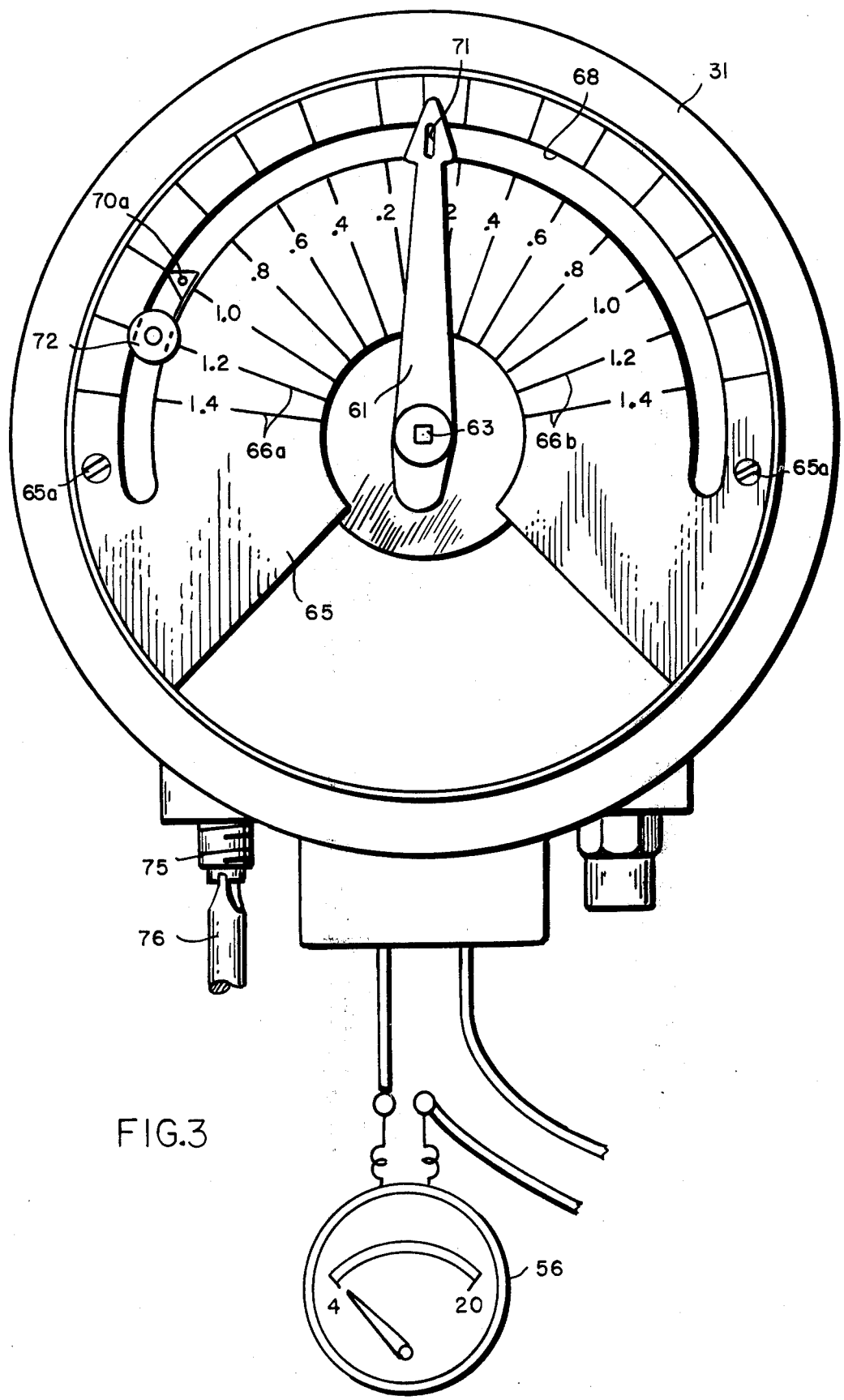
FIGS. 3 and 4 are front elevation view of the level transmitter with the instrument case cover removed, and showing the calibrating apparatus and the positioning thereof in accordance with the calibrating method of the invention.

Describing now the calibrating method of the invention, as that is generally carried out with rotary systems, the chamber 12 is first emptied or dumped, as by opening valve 74 to establish a one range limit, or zero level, condition or condition state therein, for which the no buoyancy position of displacer 15 is herein reflected at pointer 61 by its positioning as shown in FIG. 3. In the example hereof, in other words, the full weight of the displacer, which may be, say, 3 pounds serves, when entirely supported by the torque tube 20, to twist that, and therefore pointer 61, say, 4°–5°, as shown.

The transmitter output is then adjusted or corrected, as by rotation of zero adjustment 75 by a driver 76, for corresponding zero span indication thereby, as shown by suitably coupled milliameter 56, FIG. 3.

Filling of the chamber 12 with water, or the 1.0 specific gravity liquid, may in the illustrated example, displace, say, 2 pounds.

The corresponding 2 pound net displacer weight change, or decrease in the displacer weight of from 3 pounds to 1 pound, and accordingly the two thirds full excursion reduction in the load on torsion bar 20, is expressed or reflected at pointer 61 by an angular motion or shift towards the zero point, then, of, say 3.5°.

The simulating of that full span excursion with the low rate or 17 times multiplier spring of this high resolution example requires, as already mentioned, a pointer 61 shift of 60°.

In the next step of the invention method, then, marker or index 67 is positioned in slot 68 in the FIG. 3 position, or that position which may be established at the factory for full span instrument excursion for the particular operating range, in this instance the 1.0 specific gravity fluid range.

It will be appreciated in this connection that plate 65 graduations are standard, and that for more precise calibration in the field, the deviation from the nominal of the individual instrument may be found, as by standard weight calibration at the factory, recorded and calculated as a correction factor for the several operating ranges, and, if desired, correspondingly marked on the scale. Thus if for the 1.0 range the instrument correction was found to be to 0.94, for 1.0, 0.5, and 0.2 specific gravity ranges the corrected pointer settings would be marked on the scale, at, and the index positionings would be adjusted from the 1.0, 0.5 and 0.2 range standard graduations to 0.94, 0.47, and 0.19 respectively.

Figure 4:
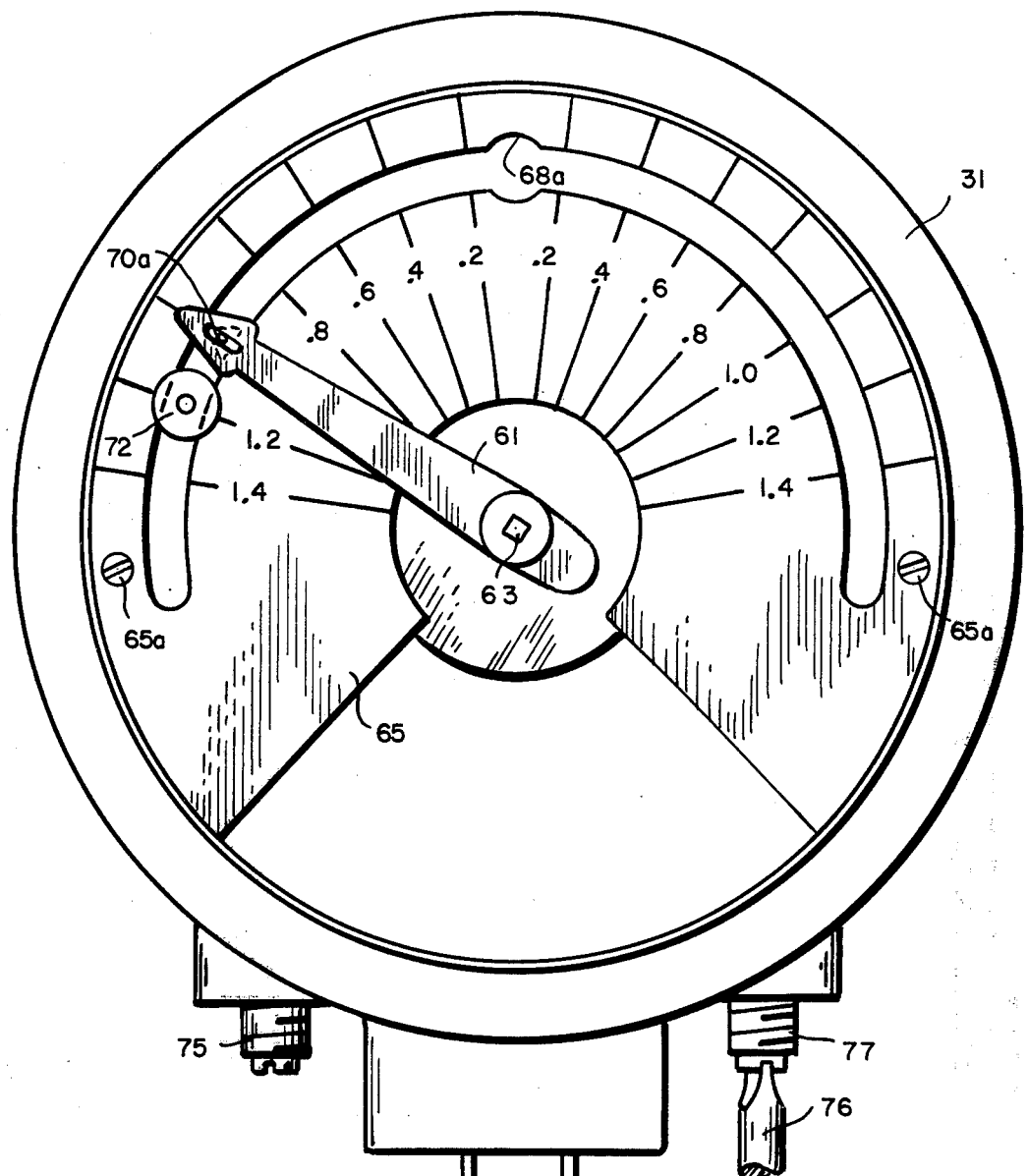
Figure 5:
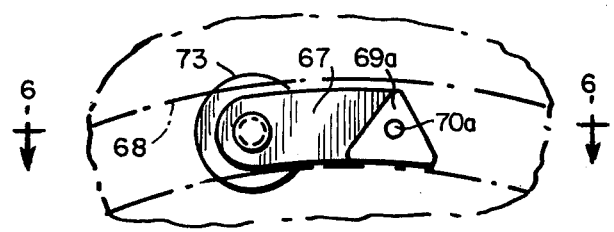
FIGS. 5 and 6 are side and top views of the invention range index, index positioning means, and pointer detent means of the invention, FIG. 6 being taken along the line 6—6 of FIG. 5.

Next the pointer 61 is deflected to and hooked over the rangeset or full span positioned index 67, by detent 70a or b, and momentarily held there while span adjustment 77 is rotated, as by driver 76, to correct the transmitter output as necessary for corresponding full scale indication by the instrument, and as shown at milliameter 56 in FIG. 4. This full span deflection of pointer 61 will now be clearly understood to torsion spring 57, and thereby rotate rod 33 and through it the sensor 55, so as to inferentially simulate the same excursion or rotation thereof as would be induced by the torsioning of torque tube 20 resulting from the rotation of it by torque arm 17 that would be produced in turn by zero to 100 or full scale filling or level changing in chamber 12 of the particular fluid, and deflection correspondingly thereto of displacer 15.

Further in accordance with the invention method, pointer 61 may now be unhooked from index detent 70a or b, and relieved or released to return to the zero level or FIG. 3 position, whereupon the zero level indication by the now unloaded or uninfluenced instrument may be re-adjusted, in the manner described.

The described winding and releasing of the pointer, or sequence of loading, adjusting, unloading and adjusting again steps, may be repeated as necessary or desired, for more exact transmitted signal correspondence with the limit positions of the spring means, or in other words to achieve the desired accuracy of calibration.

Considering now the interface calibration in accordance with the invention method, for that the limit change states are, and so the inferential simulating is of, the complete filling of the displacer chamber successively with the lower and higher weight fluids, the zero percent condition being when the chamber is fully filled with the lighter phase or fluid, and the 100 percent condition being when the chamber is fully filled with the heavier phase or fluid.

In the interface calibration, then, the displacer chamber is first emptied as before. Second, the index marker 67 is positioned at the corrected specific gravity point of the lighter fluid which may be, for example, a 0.7 liquid. Third the pointer 61 is swung to and hooked over the marker at the 0.7 position. Fourth, adjust zero: the transmitter output is adjusted for zero percent, i.e. for 4 ma. Fifth, the pointer 61 is unhooked from the index 67, and that is re-set at the corrected point for the higher specific gravity fluid, say, a 0.9 liquid. Sixth, the pointer 61 is swung to and hooked over the thus re-positioned index. Seventh, adjust range: the transmitter output is adjusted for 100 percent, or 20 ma. Finally, the described sequence of positioning and adjusting steps may be repeated until the desired or wanted precision or accuracy of calibration is attained.

Figure 7:
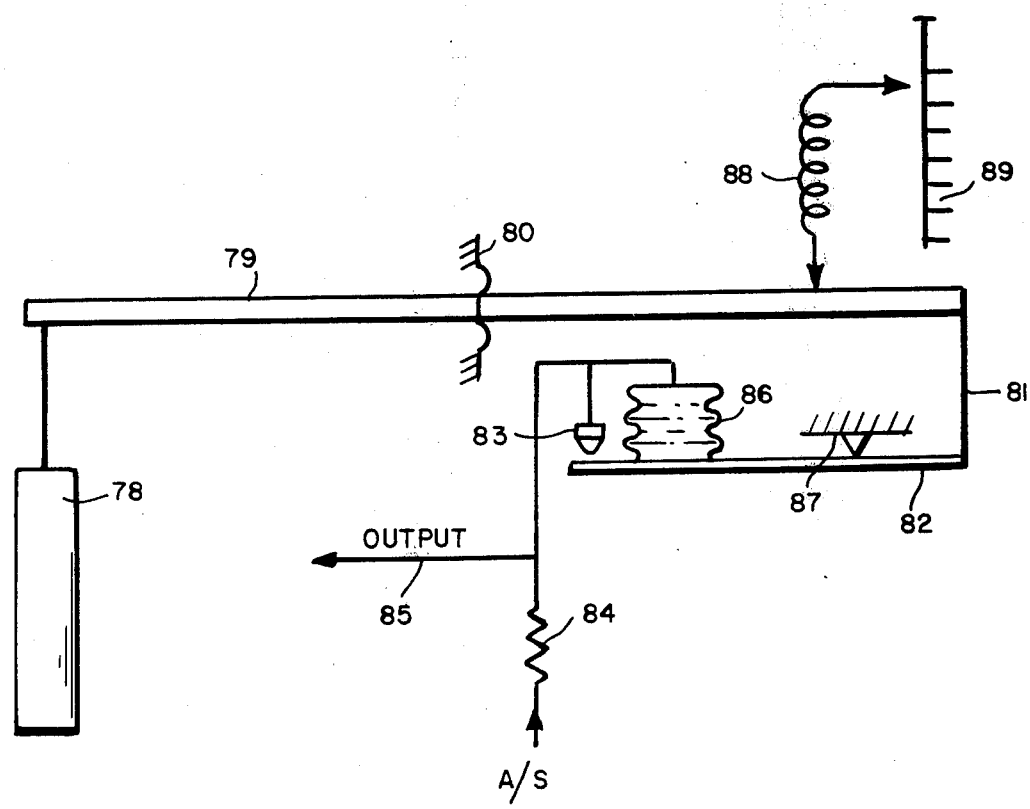
FIG. 7 is a diagrammatic illustration of the application of the invention apparatus and method to a force or null balance instrument.

FIG. 7 further illustrates the application of the invention apparatus and method, to a linear and force balanced, pneumatic displacer type level transmitter, schematically there shown, and wherein the displacer 78 presses force bar 79 about grounded or process-ambient sealing or isolating diaphragm 80. The force bar 79 movement, or response to displacer 78 force change, is transmitted through link 81, as to close flapper 82 against baffle or nozzle 83, and hence to increase the pressure of air supply 84 at output 85, and thereby also at opposing bellows 86, whereby the transmitter is re-balanced. Fulcrum 87 is adjustable for minimum to maximum range, and a compression type calibrating spring 88 of the invention is applied as shown, and positioned, as for the described, full span excursion simulating, along a linear graduated scale 89.

I claim:

1. The method of calibrating instruments having means for measuring, and means normally loaded by said measuring means for transmitting, changes in a media or process condition across a range of said condition comprising the steps of
    establishing the measured condition at the instrument at one limit of said condition range,
    adjusting said transmitting means for corresponding indication by the instrument of said condition at said one limit of said condition range,
    loading said transmitting means independently of and without affecting said measuring means to inferentially simulate said condition at the other limit of its said range, and
    adjusting said transmitting means for corresponding indication by the instrument of said condition at said other limit of its said range.

2. The method of claim 1, and
    unloading said transmitting means to re-establish said measured condition at said instrument at said one limit of its said range, and
    re-adjusting said transmitting means for corresponding indication by the instrument of said condition at said one limit of its said range.

3. The method of claim 2, and sequentially repeating said loading, adjusting, unloading and re-adjusting as necessary to achieve the desired accuracy of calibration.

4. The method of calibrating media or process condition change measuring and indicating instruments having means for sensing, and means normally influenced by said sensing means for transmitting, changes in media or process condition across a zero to full span range, comprising the steps of
    establishing at the instrument a zero condition of the measured media or process,
    adjusting said instrument for correspondence of its condition indicating with the transmitting of said zero condition by said transmitting means,
    influencing said transmitting means independently of and without affecting said sensing means to inferentially simulate a full span condition of said media or process, and
    adjusting said instrument for correspondence of its condition indicating with the transmitting of said full span condition by said transmitting means, upon its said independent influencing to simulate said full span condition.

5. The method of claim 4, and
    un-influencing said transmitting means independently of said sensing means to re-establish at said instrument said zero condition, and
    re-adjusting said instrument for correspondence of its condition indicating with the transmitting of said zero condition by said transmitting means.

6. The method of claim 5, and sequentially repeating said influencing, adjusting, un-influencing and re-adjusting as necessary to achieve the desired accuracy of calibration.

7. The method of calibrating an instrument having means for measuring and means for indicating media or process condition changes across a zero to full span range comprising the steps of establishing at the instrument measuring means a zero condition of said media or process, adjusting said instrument indicating means to correspondingly indicate said zero condition, impressing on said instrument independently of and without affecting its measuring means an inferential simulation of a full span condition of said media or process, and adjusting said instrument indicating means to correspondingly indicate said full span condition.

8. The method of claim 7, and relieving said impressing to re-establish at said instrument measuring means said zero condition, and re-adjusting said instrument indicating means to correspondingly indicate said zero condition.

9. The method of claim 8, and sequentially repeating said impressing, adjusting, relieving and re-adjusting as necessary to achieve the desired accuracy of calibration.

10. The method of calibrating an instrument for measuring and transmitting of media or process condition changes across a zero to full span range comprising the steps of establishing at the instrument a zero media or process condition, adjusting the instrument for transmitting corresponding to said zero media or process condition, torque loading said instrument transmitting independently of and without affecting the instrument measuring and to inferentially simulate a full span media or process condition, and adjusting said instrument for transmitting corresponding to said inferentially simulated full span media or process condition.

11. The method of claim 10, and relieving said torque loading of said instrument transmitting independently of said measuring to re-establish at said instrument said zero media or process condition, and re-adjusting the instrument for transmitting corresponding to said zero media or process condition.

12. The method of claim 11, and sequentially repeating said torque loading, adjusting, relieving and re-adjusting as necessary to achieve the desired accuracy of calibration.

13. The method of calibrating zero span media or process condition change sensing-indicating instruments of the null balance type in which the force or torque of a sensed condition change is opposed by a proportional force or torque comprising the steps of establishing a zero-sensed media or process condition at said instrument, adjusting said instrument for corresponding zero indicating of said zero-sensed media or process condition, impressing on said instrument, independently of and without affecting said media or process condition sensing, a force or torque inferentially simulating a full span sensed media or process condition, and adjusting said instrument for corresponding full-span indicating of said simulated full span media or process condition.

14. The method of claim 13, and relieving said force or torque impressing to return said instrument to said thereat established, zero sensed media or process condition, and re-adjusting said instrument for corresponding indicating of said zero-sensed media or process condition.

15. The method of claim 14 and sequentially repeating said impressing, adjusting, relieving and re-adjusting as necessary to achieve the desired accuracy of calibration.

16. In the calibrating of instruments for measuring and indicating changes of a media or process condition between zero and full span limits and having a measuring circuit in which is produced rotary or linear input motion or force responsive to said media or process condition changes, the steps of establishing a zero limit media or process condition at the instrument and in said measuring circuit, adjusting the instrument for corresponding indicating thereby of said zero limit media or process condition, impressing on said instrument, independently of and without affecting said input, and by spring means external to said measuring circuit, a rotary or linear independent motion or force simulating a full span limit media or process condition, and adjusting the instrument for corresonding indication thereby of said full span limit media or process condition.

17. The method of claim 16, and relieving said external spring means impressed, independent motion or force and thereby re-establishing in said measuring circuit an input motion or force responsive to said zero limit media or process condition, and re-adjusting the instrument for corresponding indicating thereby of said zero limit media or process condition.

18. The method of claim 17, and sequentially repeating said impressing, adjusting, relieving and re-adjusting as necessary to achieve the desired accuracy of calibration.

19. In the calibrating of instruments for measuring and indicating changes in a media or process condition across an operating range between zero and full span range limits and having a measuring circuit in which is produced a rotary or linear input motion or force responsive to said media or process condition changes, the steps of subjecting the instrument to one particular media or process condition of said operating range, adjusting the instrument as necessary for corresponding indication thereby of said one particular condition, duplicating, by spring means external to the measuring circuit, the rotary or linear input motion or force which is produced responsive to a change from said one to another particular media or process condition of said operating range, and adjusting the instrument as necessary for corresponding indication thereby of said other particular media or process condition.

20. Method of calibrating an instrument for measuring and indicating changes in a media or process condition between zero and full span limits and having a sensory input transmitting circuit in which is produced a rotary or linear motion or force responsive to measured changes in said media or process condition, comprising the steps of subjecting the instrument to one particular media or process condition between said limits, adjusting the instrument as necessary for corresponding indication thereby of said one particular condition, associating spring means with the instrument independently of said input but so as to apply rotary or linear motion or force to said circuit, manipulating the spring means so as to duplicate the transmitting circuit response to the sensory input from the measuring of a change from said one to a selected other media or process condition between said limits, and adjusting the instrument for corresponding indicating thereby of said selected other media or process condition.

21. The method of claim 20, wherein the media or process condition change which the spring means is manipulated to duplicate is a condition change from one to the other of said zero and full span limits.

22. The method of calibrating an instrument for measuring and indicating a media or process condition change as between zero and full span limits and having a proportional force generating sensory input and a proportional force responding measuring circuit, comprising the steps of subjecting the instrument to one actual media or process condition within said limits, adjusting the instrument as necessary for corresponding indication thereby of said one media or process condition, applying spring means to the instrument to produce a measuring circuit response duplicating the response to, but independently of the force generating by, the sensory input, manipulating said spring means to simulate the sensory input generated by a change from said one to a selected other media or process condition within said limits, and adjusting the instrument for corresponding indication thereby of said selected other media or process condition.

23. The method of calibrating instruments having displacer means for measuring, and means normally loaded by said measuring means for transmitting, changes in a media or process condition across a two-liquid interface level range of said condition comprising the steps of loading said transmitting means independently of said displacer measuring means to inferentially simulate said media or process condition at one, single liquid filled limit of said media or process condition range, adjusting said transmitting means for corresponding indication by said instrument of the percent of output for said one media or process condition range limit, loading said transmitting means independently of said displacer measuring means to inferentially simulate said media or process condition at the other, single liquid filled limit of said media or process condition range, and adjusting said transmitting means for corresponding indication by said instrument of the percent of output for said other media or process condition range limit.

24. A calibrator for an instrument for sensing and signalling media or process condition through a measuring circuit force or motion responsive and proportional to measured range condition changes, comprising spring means, means coupling said spring means to said circuit so as when relaxed to unaffect its change response, means for biasing said spring means and thereby said circuit similarly as produced by said condition changes, and means associated with said spring biasing means for indicating the degree of its manipulation to inferentially simulate media or process condition changes within the limits of the measured range.

25. The apparatus of claim 24, wherein said measuring circuit has a linear force or motion response to said condition changes, and wherein said spring means is an expansion or compression spring.

26. The apparatus of claim 25, wherein said biasing means comprises means for pulling or pushing said spring means.

27. The apparatus of claim 25, wherein said biasing means comprises a pointer, and wherein said indicating means comprises a linear scale.

28. The apparatus of claim 24, wherein said measuring circuit has a rotary force or motion response to said condition changes, and wherein said spring means is a torsion spring.

29. The apparatus of claim 28, wherein said biasing means comprises means for winding up said spring means.

30. The apparatus of claim 28, wherein said biasing means comprises a pointer, and wherein said indicating means comprises a sector scale.

31. The apparatus of claim 28, wherein said measuring circuit comprises a torque tube and rod, and wherein said torsion spring is torque coupled to the torque rod independently of the connection of that to the instrument signalling.

32. The apparatus of claim 31, wherein the connection of said torque rod to said instrument signalling is through a sleeve, and wherein said torsion spring is a wire passed through and rotatable in said sleeve.

33. The apparatus of claim 32, wherein the signalling positioning is by said sleeve, and wherein said torque rod and said sleeve have axially flexible, rotationally rigid coupling in said connection by a bellows.

34. The apparatus of claim 28, wherein said measuring circuit comprises a torque member having a spring rate, and wherein said torsion spring has a substantially lower spring rate than that of said torque member, whereby, in the torsioning of said spring by said biasing, high calibration resolution is achieved through twist of said spring which is multiplied relative to the twist of said torque member by said inferentially simulated condition changes.

35. The apparatus of claim 24, and means associated with said indicating means for releasably retaining said biasing means in position for said inferential simulating of full range condition change.

36. The apparatus of claim 35, wherein said releasably retaining means comprises a range marker, and means for adjustably positioning said range marker on said indicating means at the full span position for a selected instrument operating range.

37. The apparatus of claim 36, wherein said spring biasing means comprises a pointer, and wherein said range marker comprises detent means for engaging to said pointer.

38. The apparatus of claim 24, wherein said indicating means comprises
 a range marker, and
 means for adjustably positioning said marker at the full span positions for selected instrument operating ranges.

39. The apparatus of claim 38, wherein said adjustably positioning means is arranged to intersect the movement of, and to thereby serve as an overrun stop for, said spring biasing means.

40. Apparatus for calibrating a media or process condition change sensing and signalling instrument of the rotary motion type having a process-instrument connecting number which is connected at its process end for rotary response to the condition change sensing, and connected at its instrument end for rotary positioning of the instrument change signalling subject to said rotary change sensing response, comprising
 a torsion spring arranged for rotating said instrument end of said connecting member,
 means for winding manipulation of said torsion spring, and
 means for indicating the degree of winding of said torsion spring to rotate said connecting member instrument end, and thereby to rotary position said instrument change signalling, correspondingly as said instrument change signalling would be positioned by said connecting member instrument end subject to the rotary sensing response of said connecting member process end to a condition change inferentially to be simulated by said torsion spring winding.

41. The apparatus of claim 40, wherein said torsion spring is also arranged so as, when not itself windingly manipulated, to rotate freely with said instrument end of said connecting member, and therefore to unaffect its said rotary positioning of the instrument change signalling.

42. The apparatus of claim 40, wherein said connecting member comprises a torque member having a spring rate, and wherein said torsion spring has a substantially lower spring rate than that of said torque member, whereby, in said winding manipulation of said torsion spring, high calibrating resolution is achieved through rotation of said torsion spring which is multiplied relative to the rotation of said torque member by the condition change simulated by said winding manipulation of said spring.

43. The method of calibrating instruments having means for measuring, and means normally loaded by said measuring means for transmitting, changes in a media or process condition across a range of said condition, comprising the steps of
 loading said transmitting means independently of and without affecting said measuring means to inferentially simulate change from a measured condition to a condition at or substantially at one limit of said range,
 adjusting said transmitting means for corresponding indication by the instrument of said condition at or substantially at said one limit of said condition range,
 loading said transmitting means independently of and without affecting said measuring means to inferentially simulate change to a condition at or substantially at the other limit of said condition range, and
 adjusting said transmitting means for corresponding indication by the instrument of said condition at or substantially at said other limit of its said range.

* * * * *